W. F. BROWN.
STIRRING MOLTEN GLASS IN CONTINUOUS TANK FURNACES.
APPLICATION FILED NOV. 1, 1920.
1,414,008.
Patented Apr. 25, 1922.
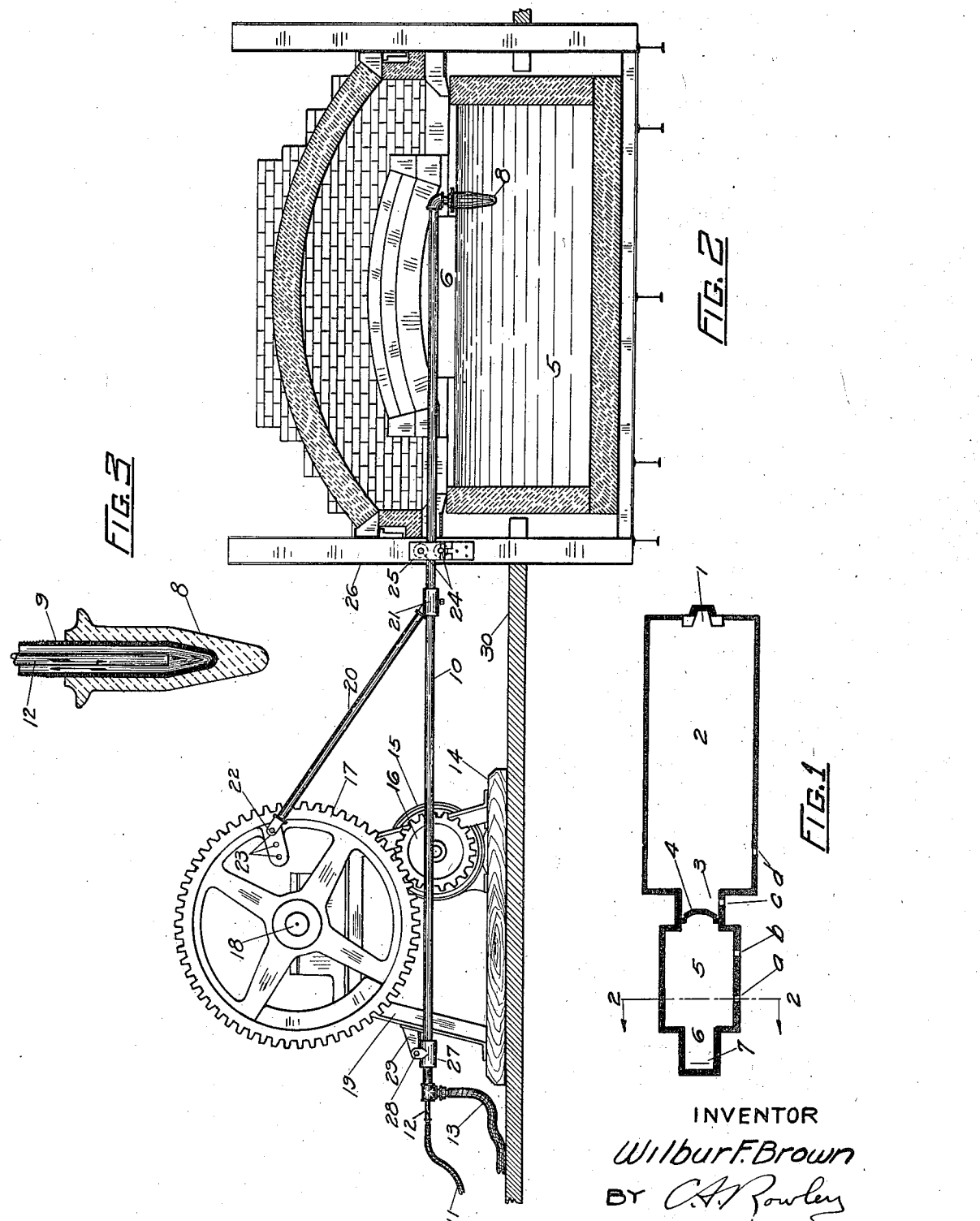
INVENTOR
Wilbur F. Brown
BY C. A. Rowley
ATTORNEY

UNITED STATES PATENT OFFICE.

WILBUR F. BROWN, OF CHARLESTON, WEST VIRGINIA, ASSIGNOR TO THE LIBBEY-OWENS SHEET GLASS COMPANY, OF TOLEDO, OHIO, A CORPORATION OF OHIO.

STIRRING MOLTEN GLASS IN CONTINUOUS TANK FURNACES.

1,414,008. Specification of Letters Patent. Patented Apr. 25, 1922.

Application filed November 1, 1920. Serial No. 420,883.

*To all whom it may concern:*

Be it known that I, WILBUR F. BROWN, a citizen of the United States, residing at Charleston, in the county of Kanawha and State of West Virginia, have invented new and useful Improvements in Stirring Molten Glass in Continuous Tank Furnaces, of which the following is a specification.

This invention relates to a system for stirring the molten glass in a continuous tank furnace. The device herein shown and described is particularly designed for use with a continuous tank furnace of the type which supplies a flow of molten glass from which a continuous sheet of glass is drawn, as in the Colburn process, set forth for example in the patent to I. W. Colburn, 1,248,809, granted Dec. 4, 1917. This stirring system is in no wise limited to the above, or any other sheet drawing process, but may be used with any furnace or system, where a continuous supply of glass is melted and flowed to a delivery point.

In a furnace of the above mentioned type, the mixed batch and cullet is fed in at one end of the tank, where it is melted by exposure to intense heat, and slowly flows back through suitable refining and cooling chambers, till it is of the proper temperature and consistency for delivery to the sheet-drawing or other article forming machine as the case may be. Now certain elements of the batch, such as the alkalies, have a lower fusing point than other components, such as lime and silica, and if the temperature of the furnace should fall somewhat below normal, the components will melt unequally and the flow of molten glass will become streaked and of uneven composition. These streaks or flow lines, if left undisturbed, may follow through the entire furnace and be drawn into the sheet produced from the molten glass, causing striae or "lines" in the sheet, which injure the quality of the finished product. It is the purpose of the apparatus about to be described, in connection with the accompanying drawings, to break up these flow lines, and blend and interfuse the uneven striae in the molten glass, so as to furnish an even and homogeneous flow of glass to the drawing point.

In the accompanying drawings:

Fig. 1 is a diagram, illustrating the horizontal plan of a continuous tank furnace of the type to which this invention is particularly applicable.

Fig. 2 shows the stirring apparatus in side elevation, the furnace being shown in vertical transverse section, substantially on the line 2—2 of Fig. 1.

Fig. 3 is a longitudinal section through the stirring finger, and a portion of the supporting rod therefor.

Referring first to Fig. 1, the batch is fed in, through dog-house 1, to the melting tank 2, where it is fused and reduced to a molten or fluid condition by means of gas flames, in a manner well known in the art. The molten glass flows back through the reduced neck portion 3, and under suitable floaters 4, which skim back any undesirable surface accumulations, and thence into a second "refining" chamber 5. From chamber 5, the glass flows through the reduced cooling chamber 6 to the point where the sheet 7, or other article, is drawn therefrom. This flowing and refining process will normally bring the molten glass to the drawing point in a very even and homogeneous condition, and at the proper temperature, but oftentimes, due to variations in furnace temperature or other causes, streaks of unequal composition will be formed in the flowing glass, as stated above. These streaks may commence in the furnace 2, where the batch ingredients are first melted, and follow through the entire furnace, and be drawn into the glass sheet. To overcome this defect, the stirring apparatus shown in Figs. 2 and 3 has been devised. A stirring finger or thimble 8 of porcelain or pot-clay is carried on a downwardly projecting stirring rod 9, secured by a suitable elbow to the end of a horizontal supporting rod 10, which extends through an aperture in one side wall of the furnace. The rods 9 and 10 are water-cooled to prevent their destruction by the furnace heat, being preferably formed of inner and outer pipe sections, the water flowing in from a hose connection 11, through the inner pipe 12, see Fig. 3, thence back through the outer pipes 9 and 10, and through a flexible connection 13 to the sewer. The finger 8, when in working position, projects downwardly into the slowly flowing stream of molten glass, and by means of the supporting rod 10, the finger may be reciprocated back and forth through the flowing glass thus breaking up and dispersing the lines of uneven composition in the glass stream.

This manipulation of rod 10 may be performed satisfactorily by hand, but a convenient and simple apparatus for automatically and continuously carrying on this process is illustrated in Fig. 2. On a skid or base 14 adapted to rest on the floor 30 at the side of the tank, is mounted an electric motor 15, which drives through pinion 16, the large gear and fly-wheel 17, whose shaft 18 is journaled on the upright framework 19, also carried by the base 14. A pitman 20 is pivoted at one end to an adjustable sleeve 21 on the rod 10, and at its other end is pivoted by wrist-pin 22, in one of the bearings 23 in crank wheel 17. By moving the connection from one to another of the bearings 23 the length of the stroke given to the stirring finger may be adjusted. Rod 10 is guided, near its inner end, between the guide rollers 24, mounted in a bracket 25, on the furnace buckstay 26. Near its outer end, the rod 10 slides through a sleeve 27, pivoted at 28 to a bracket 29 extending from framework 19.

In operation, this apparatus may be used at various points in the furnace, indicated for example at a, b, c, and d in Fig. 1, according to the particular conditions prevailing at the time, with regard to the formation of the lines or streaks in the glass. The apparatus shown being mounted on a single base, may easily be moved from one position to another. Before immersing the thimble or finger in the molten glass it is first heated to a high temperature, and then allowed to assume practically the same temperature as the molten glass in the tank. This may be accomplished by laying it for a time on or near the surface of the glass bath. It is then brought into position, projecting vertically downward into the flowing glass, as shown in Fig. 2. The water-cooling system is only sufficient to protect the metal rods which carry the thimble, and will not materially raise the temperature of the thimble, so that no chilling effect will result from the presence of the porcelain thimble in the flowing glass. When the apparatus is set in motion the stirrer will reciprocate back and forth in a path transverse to the stream of glass. As the glass flows very slowly through the tank, the thimble or finger will function to very thoroughly stir and coalesce the different portions of the molten glass as it passes across the path of the stirrer, and the resultant stream will be of an even and homogeneous composition, and the glass sheet drawn therefrom will be free from lines or striae.

It will, of course, be understood that this invention is not limited to use with a furnace used in connection with a sheet drawing apparatus, but may be used with like results, in any other type of continuous tank furnace, whether for drawing cylinders, or for delivering molten glass to any flowing or feeding apparatus.

I claim:

1. The method of increasing the homogeneity of the molten glass in a continuous tank furnace, by passing a solid object continuously back and forth through the flowing glass, to disperse the flow lines or streaks of unequal composition.

2. The combination with a continuous tank furnace, wherein the molten glass flows continuously from the melting end to the delivery end of the tank, of a stirring device within the furnace for dispersing striæ in the flowing glass, and increasing its homogeneity.

3. The combination with a continuous tank furnace, wherein the molten glass flows continuously from the melting end to the delivery end of the tank, of a stirring device moving transversely through the flowing glass.

4. The combination with a continuous tank furnace, wherein the molten glass flows continuously from the melting end to the delivery end of the tank, of a vertical stirring rod, and means for reciprocating it transversely through the flowing glass.

5. The combination with a continuous tank furnace, wherein the molten glass flows continuously from the melting end to the delivery end of the tank, of a vertical stirring finger, water-cooled supporting means therefor, and means including the support for reciprocating the finger through the flowing glass.

6. The combination with a continuous tank furnace, wherein the molten glass flows continuously from the melting end to the delivery end of the tank, of a porcelain stirring thimble, an artificially cooled rod extending into the tank above the glass having a downwardly projecting portion supporting the thimble within the molten glass, and means for reciprocating the rod, whereby the thimble is moved back and forth through the flowing glass.

7. The combination with a continuous tank furnace, wherein the molten glass flows continuously from the melting end to the delivery end of the tank, of an internally cooled rod extending transversely into the tank above the flowing glass, a porcelain stirring finger projecting downwardly from the rod into the flowing glass, and means for automatically and continuously reciprocating the rod, whereby the finger will break up the continuous flow lines in the glass and increase its homogeneity.

8. The combination with a continuous tank furnace comprising a portion wherein the glass is melted, a refining and cooling portion and a receptacle from which a glass article may be drawn, the glass flowing continuously through the tank portions in the order described, of a stirring device, and means for moving it through the glass stream at a location intermediate the melting point and the drawing point.

9. The combination with a tank furnace for furnishing a continuous flow of molten glass to a continuous sheet glass drawing apparatus, of a stirring device and means for reciprocating it transversely through the flowing glass.

Signed at Charleston in the county of Kanawha and State of West Virginia, this 18th day of October, 1920.

WILBUR F. BROWN.